United States Patent [19]
Togino

[11] Patent Number: 5,847,878
[45] Date of Patent: Dec. 8, 1998

[54] OBSERVATION APPARATUS COMPRISING EYEPIECE OPTICAL SYSTEMS

[75] Inventor: Takayoshi Togino, Koganei, Japan

[73] Assignee: Olympus Optical Co., Ltd., Tokyo, Japan

[21] Appl. No.: 720,668

[22] Filed: Oct. 2, 1996

[30] Foreign Application Priority Data

Oct. 5, 1995 [JP] Japan ................................. 7-258414

[51] Int. Cl.⁶ .................................................. G02B 27/14
[52] U.S. Cl. ............................................ 359/630; 359/633
[58] Field of Search ................................. 359/630, 631, 359/633, 636, 638; 345/8

[56] References Cited

U.S. PATENT DOCUMENTS

| | | | |
|---|---|---|---|
| 4,961,626 | 10/1990 | Fournier, Jr. et al. | 359/630 |
| 5,129,716 | 7/1992 | Holakovszky et al. | 351/50 |
| 5,189,452 | 2/1993 | Hodson et al. | 353/94 |
| 5,299,063 | 3/1994 | Fritz et al. | 359/631 |
| 5,334,991 | 8/1994 | Well et al. | 345/8 |
| 5,384,654 | 1/1995 | Iba | 359/364 |
| 5,392,158 | 2/1995 | Tosaki | 359/633 |
| 5,539,578 | 7/1996 | Togino et al. | 359/630 |
| 5,546,227 | 8/1996 | Yasugaki et al. | 359/630 |
| 5,629,807 | 5/1997 | Hall | 359/630 |

FOREIGN PATENT DOCUMENTS

| | | | |
|---|---|---|---|
| 5-196898 | 8/1993 | Japan . | |
| 5-268547 | 10/1993 | Japan . | |
| 5-303053 | 11/1993 | Japan | 359/630 |
| 6-123852 | 5/1994 | Japan . | |
| 6-133253 | 5/1994 | Japan . | |
| 6-334942 | 12/1994 | Japan . | |

OTHER PUBLICATIONS

Fisher, "Helmet-Mounted Projection Display System Featuring Beamsplitter", PCT/US92/03226, Oct. 1992.

Primary Examiner—Georgia Y. Epps
Assistant Examiner—Ricky Mack
Attorney, Agent, or Firm—Frishauf, Holtz, Goodman, Langer & Chick

[57] ABSTRACT

The present invention provides a head-mount image display apparatus which is maximumly reduced in size so as to arrange eyepiece optical systems in limited spaces such that the eyepiece optical systems do not touch the user's nose. The head-mount image display apparatus comprises LCD for displaying images for left and right eyes, eyepiece optical systems for guiding the images for left and right eyes displayed on the LCD to left and right eyeballs, body of the display apparatus for supporting the LCDs and the eyepiece optical systems for the left and right eyes such that the LCD and the eyepiece optical system for the right eyepiece is arranged at a predetermined distance from the LCD and the eyepiece optical system for the left eye, wherein corners of the eyepiece optical systems, at least which face a user's nose, are each provided with a chamfered portion planed off so as not to touch the user's nose.

18 Claims, 9 Drawing Sheets

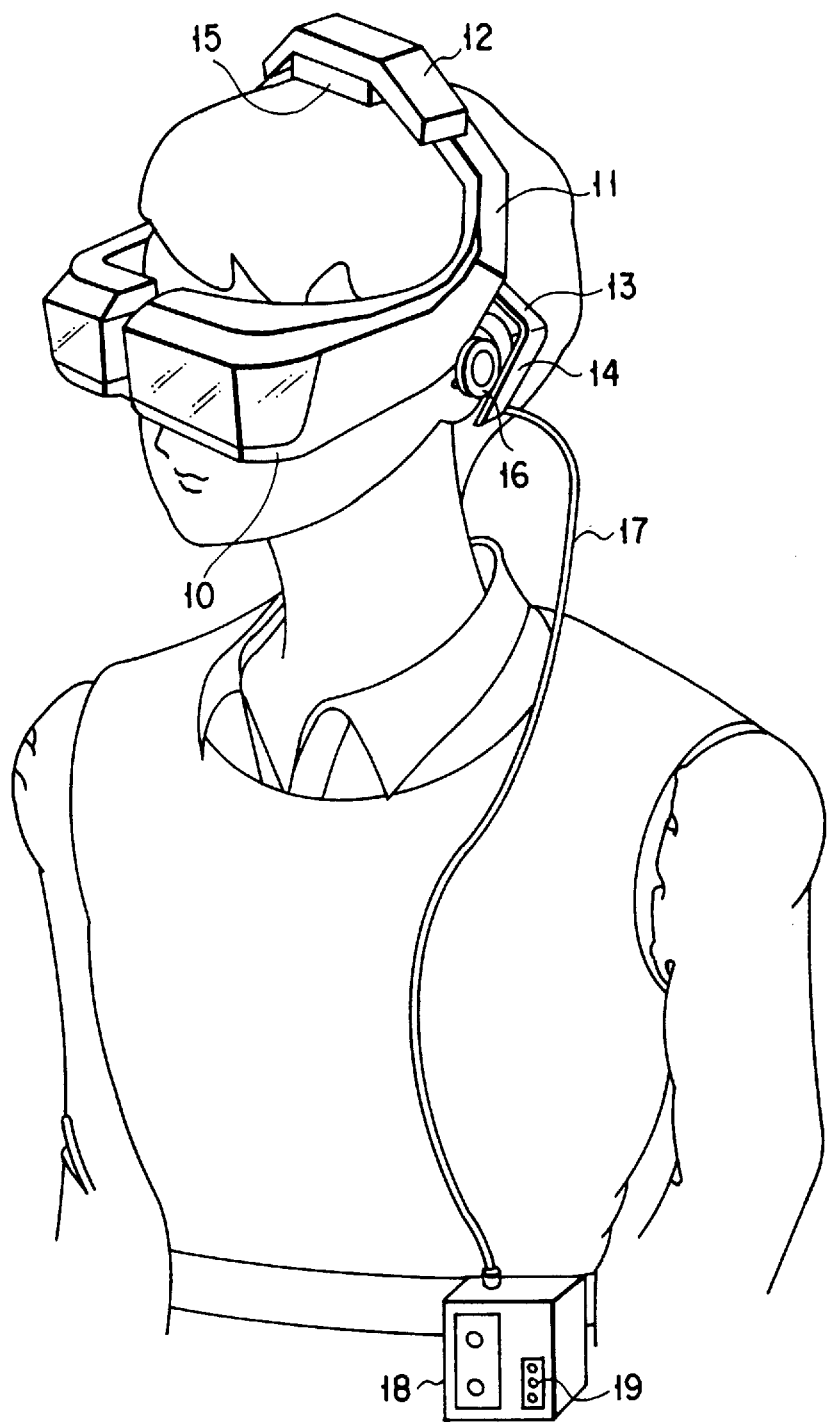
F I G. 1

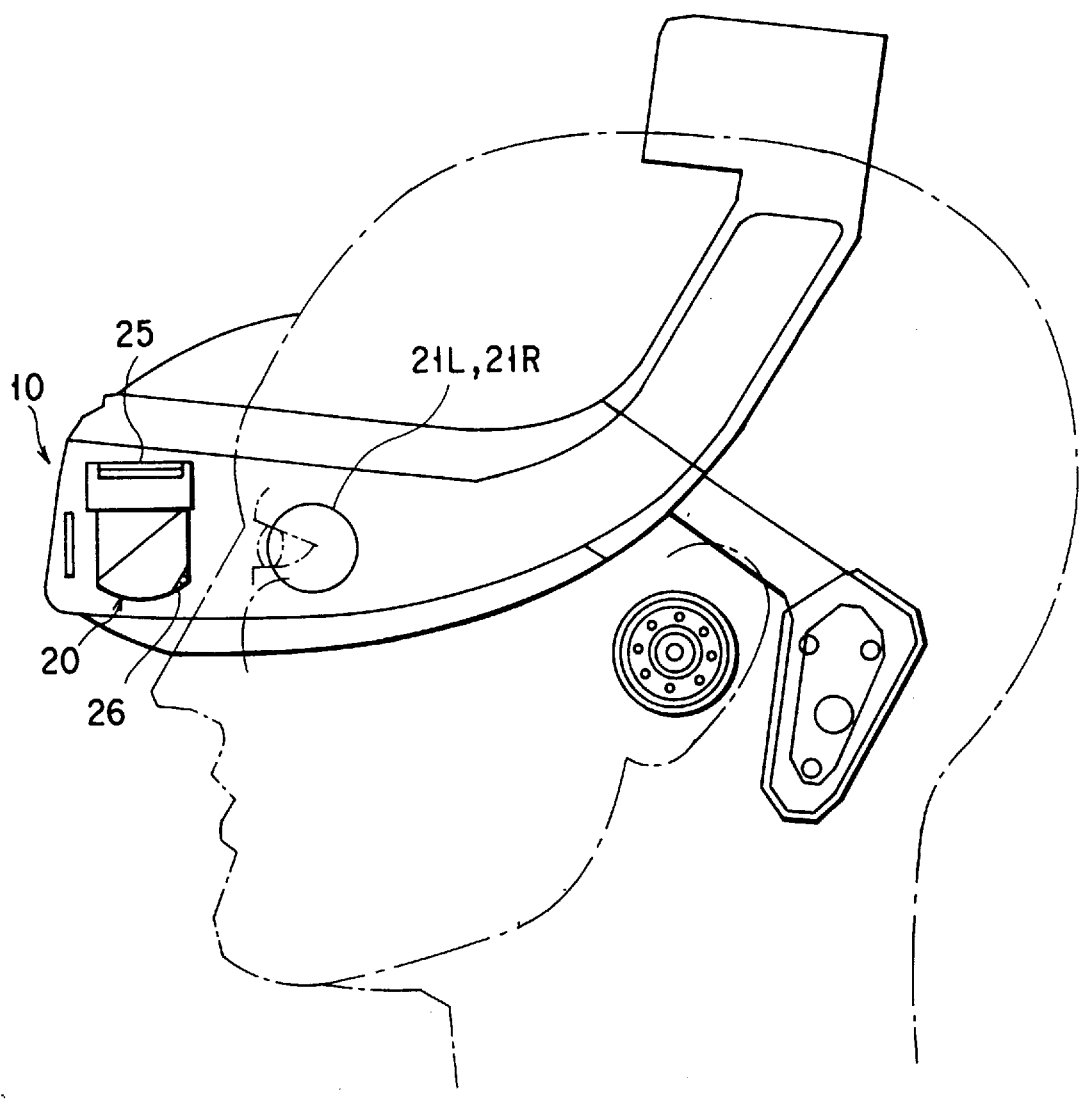
F I G. 4

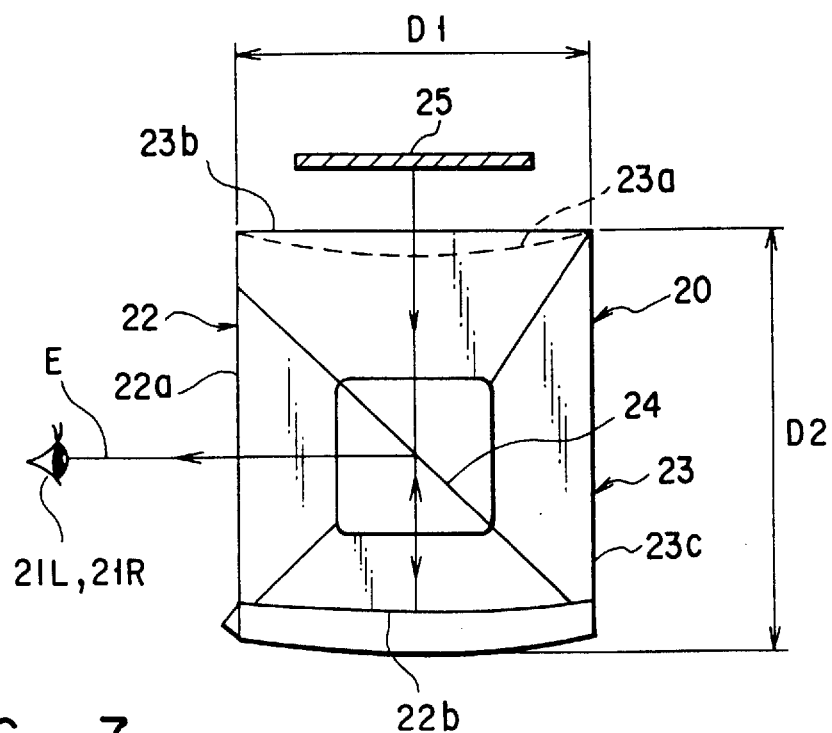
F I G. 7
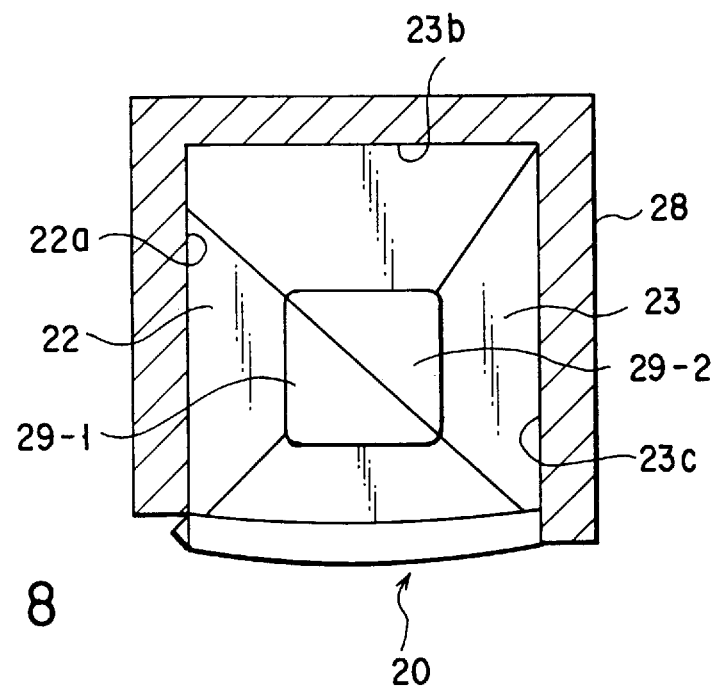
F I G. 8

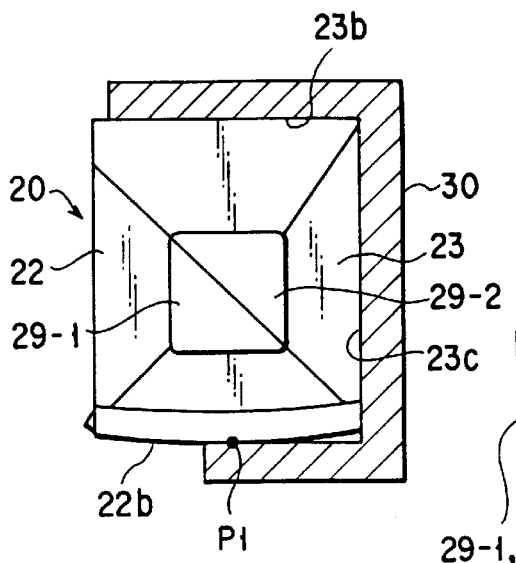
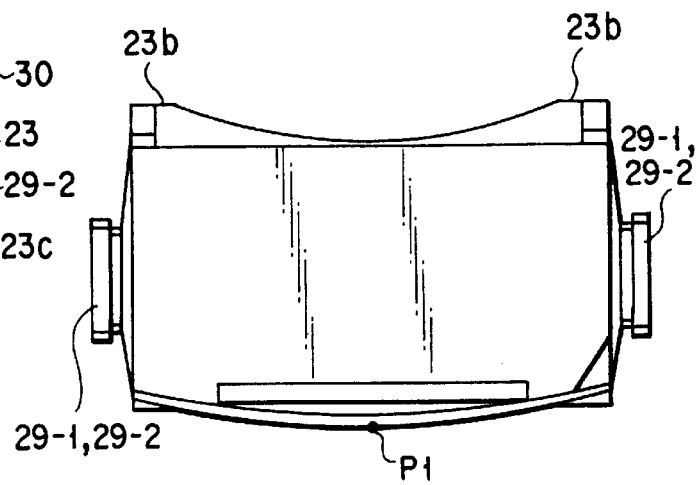
FIG. 9A
FIG. 9B
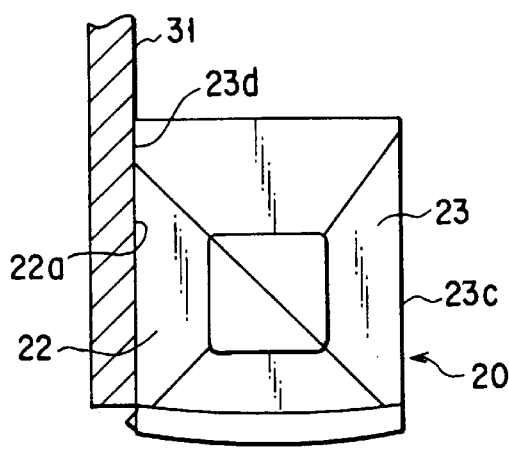
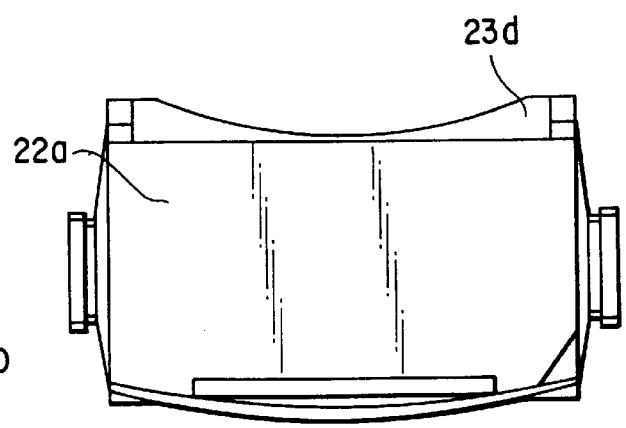
FIG. 10A
FIG. 10B

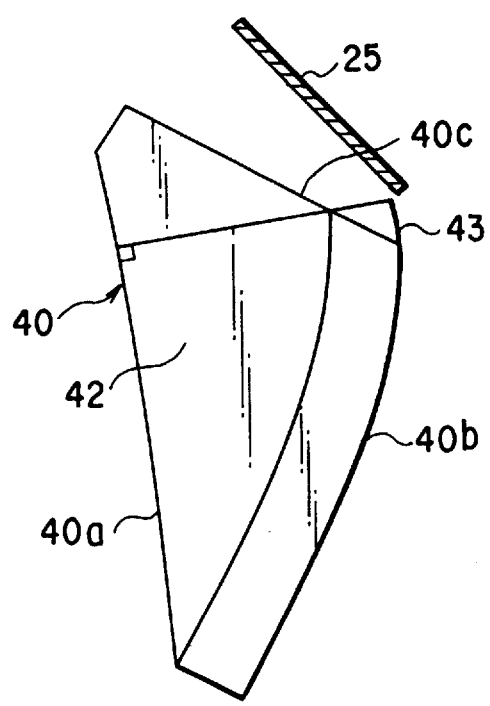
F I G. 14A
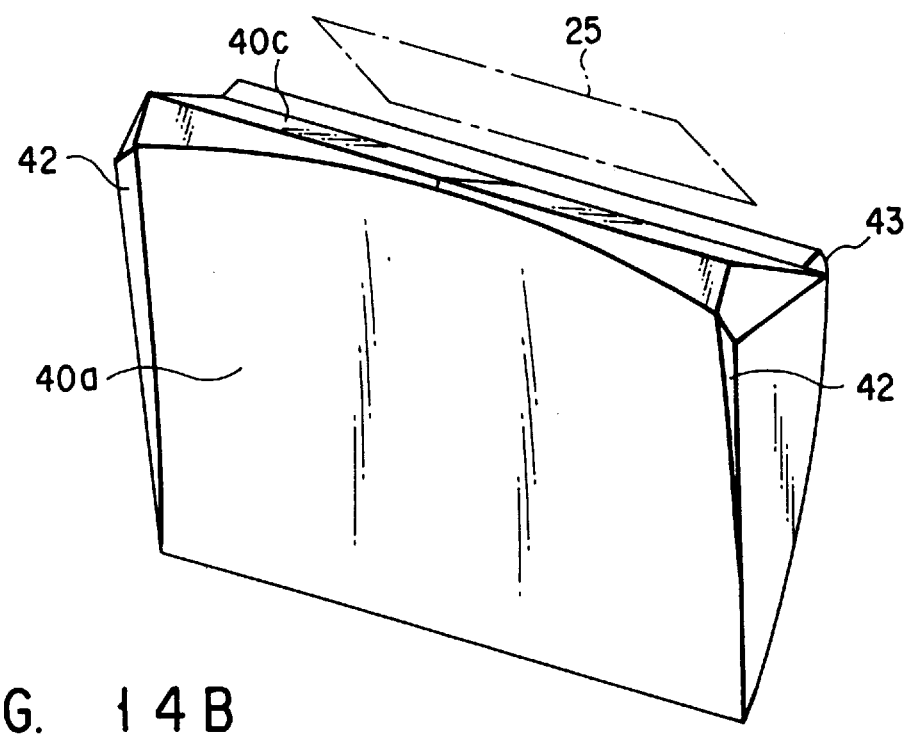
F I G. 14B

OBSERVATION APPARATUS COMPRISING EYEPIECE OPTICAL SYSTEMS

BACKGROUND OF THE INVENTION

1. Field of the Invention

This invention relates to a head-mount image display apparatus which a user wears on the head to see images.

2. Description of the Related Art

The head-mount image display apparatus used for watching images generally comprises a left image display element for displaying an image to be guided to a left eye, a left eyepiece optical system for guiding the left image to the left eye of the user, a right image display element for displaying an image to be guided to a right eye, and a right eyepiece optical system for guiding the right image to the right eye of the user. Various head-mount image display apparatuses are known, among which are: an apparatus having a pupil distance adjusting system and a diopter adjusting system (Jpn. Pat. Appln. KOKAI Publications 5-196898 and 6-123852), an apparatus having a see-through system (Jpn. Pat. Appln. KOKAI Publication 5-268547), an apparatus for improving the image display (Jpn. Pat. Appln. KOKAI Publication 6-133253), and an apparatus reduced in size (Jpn. Pat. Appln. KOKAI Publication 6-334942).

To decrease the size of a head-mount image display apparatus, the optical guide path for image viewing may be shortened. If the optical guide path is shortened, however, some of the image display elements are located near to the user's nose when the user wears the head-mount apparatus. Suppose either eyepiece optical system has at least three optical faces, e.g. a first face facing the eyeball and having a transmission effect, a second face having a reflection effect and having a rear reflecting mirror, and a third face facing an image display element and having the transmission effect. Then, one corner of the eyepiece optical system is so near to the user's nose as to touch the nose in some mounting conditions. As a result, the user feels uncomfortable while wearing the apparatus.

With the conventional method, in order to solve this problem, the eyepiece optical system may be arranged such that the components of the apparatus do not touch the nose of the people whose pupil distance and positional relationship of eyes and nose fall within a predetermined range of normal distribution. If the eyepiece optical system is so designed, however, the head-mount image display apparatus cannot be maximumly reduced in size and thus cannot be compact. Therefore, the conventional apparatus wherein the eyepiece optical system has a part located too near the user's nose when the user wears the apparatus cannot have its size decreased and give the user a comfortable feeling.

In the case where the eyepiece optical system comprises two prisms joined together, the prisms cannot easily be situated with desired precision (±0.1 mm, for example) after the eyepiece optical system is assembled, unless the strict size management is achieved when the prisms are joined.

In order to accomplish the size management of the prisms, it is necessary to provide to at least two planes as reference planes of the size management for each prism. However, when the eyepiece optical system comprises two prisms, reference plane of the size management is not provided to the prisms in the conventional head-mount image display apparatus. Therefore, the two joined prisms may shift along the joining face, and the eyepiece optical system cannot attain a predetermined precision. The image guided through such an eyepiece optical system may be deformed and difficult to see.

SUMMARY OF THE INVENTION

The object of the present invention is to provide a head-mount image display apparatus which is maximumly reduced in size so as to arrange eyepiece optical systems in limited spaces such that the eyepiece optical systems do not touch the user's nose.

The head-mount image display apparatus of the present invention comprises image display elements for displaying images for left and right eyes; eyepiece optical systems for guiding the images for left and right eyes which are displayed on the image display elements, to left and right eyeballs; and positioning means for supporting the image display elements and the eyepiece optical systems for the left and right eyes such that the image display element and the eyepiece optical system for the right eye is set at a predetermined distance from the image display element and the eyepiece optical system for the left eye, wherein corners of the eyepiece optical systems, at least which face a user's nose, are each provided with a chamfered portion planed off in a predetermined manner so as not to touch the user's nose.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a perspective view showing a head-mount image display apparatus according to a first embodiment of the present invention, which is attached to the head of a user;

FIG. 4 is an enlarged view of the section containing the image display element and eyepiece optical system of the first embodiment;

FIG. 7 shows a plane for size management for the prism, which is provided to the eyepiece optical system of the first embodiment;

FIG. 8 shows the eyepiece optical system of the first embodiment, which is contained in a joining jig;

FIG. 9A shows the eyepiece optical system of the first embodiment, which is contained in a joining jig;

FIG. 9B is a side view of the eyepiece optical system shown in FIG. 9A, without the joining jig;

FIG. 10A shows the eyepiece optical system of the first embodiment, which is provided with a plane for the size management;

FIG. 10B shows the eyepiece optical system subjected to the size management;

FIG. 14A shows the other structure of the eyepiece optical systems of the head-mount image display apparatus according to the second embodiment;

FIG. 14B is a perspective view of the eyepiece optical system shown in FIG. 14A;

DETAILED DESCRIPTION OF THE PREFERRED EMBODIMENTS

Figure 2:
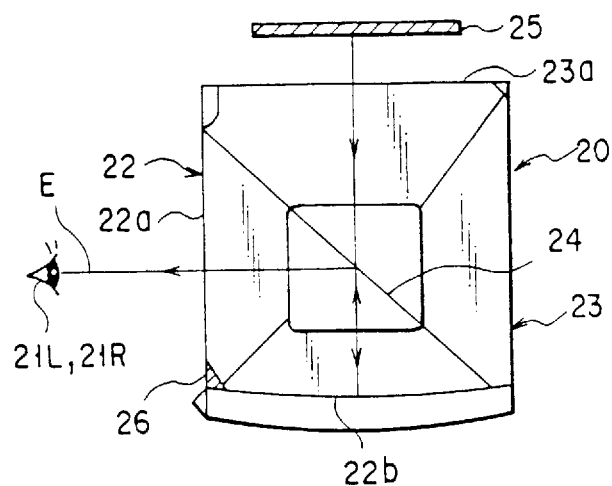
FIG. 2 shows the structure of the optical system in the body of the head-mount image display apparatus according to the first embodiment.

This invention can be more fully understood from the following detailed description of the head-mount image display apparatus according to a first embodiment of the present invention when taken in conjunction with the accompanying drawings.

FIG. 1 shows that the image display apparatus comprising a display apparatus body 10 is attached to the head of a user.

As shown in FIG. 1, the body 10 is connected to one end of side head frames 11 each extending from the portion near the upper portion of each of the right and left ears of the user to the parietal portion of the user, and a parietal frame 12 extending on the parietal portion is connected between another end of the side head frames 11.

The portions near the joint portions of the side head frames 11 and the body 10 are provided with metal plate springs 13 connected thereto at one end. Another end of the metal plate springs 13 is connected to left and right rear frames 14.

Each of the left and right rear frames 14 are located in a portion positioned at the back of the ears and extending from the back of the head to the bottom of the neck of the user. The rear frames 14 are fixed together with the side frames 11 and the parietal frame 12 such that the body 10 is settled on the face of the user. The inner periphery of the parietal frame 12 is provided with a parietal pad 15 to be put on the parietal portion of the user.

A headphone 16 is provided to portions of the body 10 near the ears of the user. There is also provided a cable 17 for transmitting an audio signal to the headphone 16 and transmitting a signal such as a video signal to the body 10.

One end of the cable 17 is connected to a terminal (not shown) in the parietal frame 12 through the rear frame 14, plate spring 13, and the side head frame 11. The terminal, headphone 16, and body 10 are electrically connected by cables not shown. The other end of the cable 17 is connected to a video cassette reproduction apparatus 18 provided with sound controlling means 19 for controlling sound volume or the like.

In the above-mentioned apparatus, a predetermined connecter may be provided to the end of the cable 17 on the side of the video cassette reproduction apparatus 18 such that the apparatus can be connected to the other known video cassette player. The cable 17 may be connected to a tuner for receiving the television broadcasting wave to receive the television broadcast or may be connected to an apparatus such as a personal computer so as to display computer graphic image, multimedia image, virtual reality image, and so on. The cable 17 may be replaced with a device such as an antenna to receive the images and audio signals from the outside which are carried by waves.

FIG. 2 shows the structure of the optical system provided in the body 10. FIG. 2 is the drawing showing the eyepiece optical system 20 shown in FIG. 3A, from an arrow A. The eyepiece optical system 20 is provided on the both sides of the left eyeball 21L and the right eyeball 21R of the user, to be arranged symmetrically and have the same structure. Accordingly, the description of the structure is provided only for the eyepiece optical system 20 on the side of the left eyeball 21L, and the description for the eyepiece optical system 20 on the side of the right eyeball 21R is omitted.

As shown in FIG. 2, the eyepiece optical system 20 is located in front of the left eyeball 21L of the user.

The eyepiece optical system 20 comprises first prism 22, second prism 23, and half mirror 24 inserted to the joining face of the first and second prisms 22 and 23 at the angle of 45° with respect to the optical axis. The first prism 22, half mirror 24, and second prism 23 are joined together by a bonding method and the like. According to the bonding method employed here, the prisms and half mirror are bonded with a transparent sheet-like double-sided adhesive tape.

The first prism 22 includes a first face 22a facing the left eyeball 21L and having a light-transmission effect, and a second face 22b having a reflection effect and having a rear reflection mirror.

The second prism 23 has a third face 23a facing an image display element 25 (more specifically, Liquid Crystal Display element, therefore, hereinafter referred to as LCD) and having a light-transmission effect. The LCD 25 is provided on the rear face with a backlight not shown.

In the eyepiece optical system 20 having the above structure, the light beams of the image displayed in the LCD 25 is transmitted through the third face 23a at first, and then enter into the half mirror 24. The light beam transmitted through the half mirror 24 is reflected by the second face 22b, then enters into the half mirror 24 again. While, the light beam reflected by the half mirror 24 is transmitted through the first face 22a, then is guided to the user's eyeball.

The head-mount image display apparatus according to this embodiment is provided with a pupil distance adjusting system 50 (shown in FIGS. 5A to 5C) supporting the LCD 25 and eyepiece optical system 20 on the side of the left eyeball 21L and the LCD 25 and eyepiece optical system 20 on the side of the right eyeball 21R such that the LCD 25 and the eyepiece optical system 20 for the right eyeball 21R is arranged at a predetermined distance from that of the left eyeball 21L.

Figure 3A:
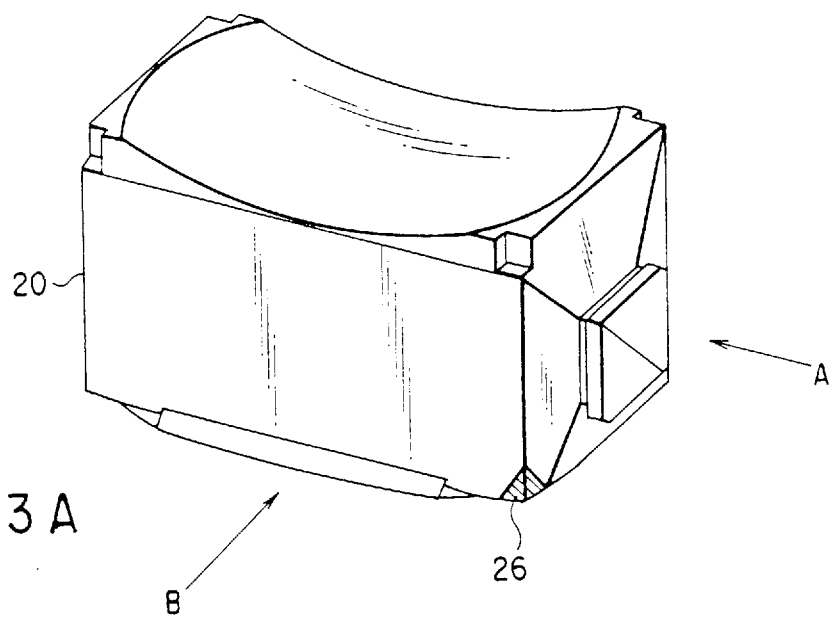
FIG. 3A is a perspective view of the eyepiece optical system according to the first embodiment.
Figure 3B:
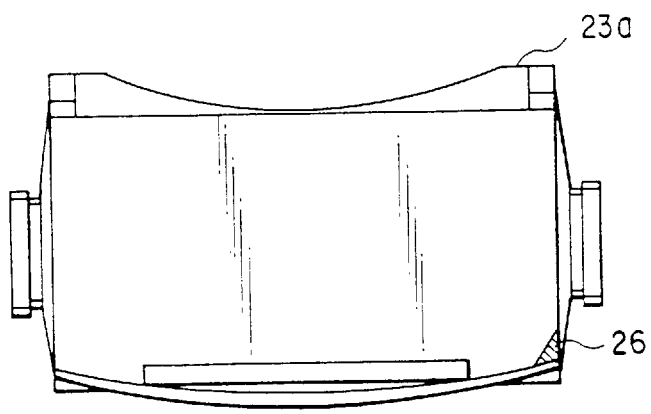
FIG. 3B is a side view of the eyepiece optical system shown in FIG. 3A, shown from an arrow B.

As shown in FIG. 3A, the eyepiece optical system 20 is substantially formed in a rectangular parallelepiped. On at least one (shaded in FIGS. 3A and 3B) of four corners of the eyepiece optical system 20, a chamfered portion 26 is formed. The corner on which the chamfered portion 26 is formed faces the user's nose when the user wears the apparatus. The positional relationship of LCD 25 and the eyepiece optical system 20 when the user wears the apparatus is shown in FIG. 4.

The chamfered portion 26 is preferable to be formed as small as possible so as not to decrease the image display area, more specifically, is preferable to be formed below the visual line E (shown in FIG. 2) of the user and in the region of one third of an entire area of the eyepiece optical system 20 from the bottom line.

By providing the chamfered portion 26 in this manner, the eyepiece optical system 20 does not touch the user's nose even if the apparatus is reduced in size by shortening the optical guide path of the image observing optical system as shown in FIG. 4. Accordingly, even if the eyepiece optical system 20 may be arranged such that the components of the apparatus do not touch the nose of people whose pupil distance and positional relationship of eyes and nose fall within a predetermined range of normal distribution, the head-mount image display apparatus can be maximumly reduced in size and thus can be compact.

Figure 5A:
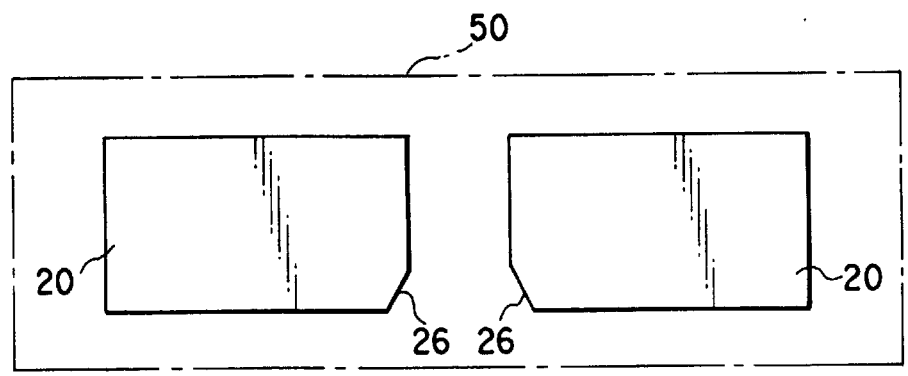
FIG. 5A shows chamfered portions provided to the eyepiece optical systems of the first embodiment.
Figure 5B:
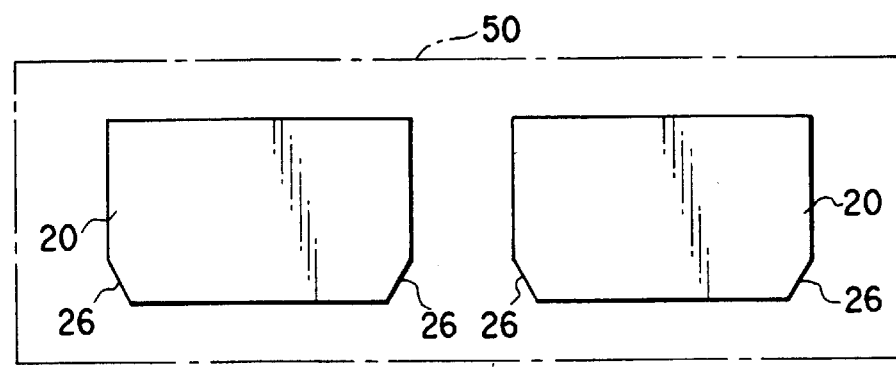
FIG. 5B shows chamfered portions provided to the eyepiece optical systems of the first embodiment.
Figure 5C:
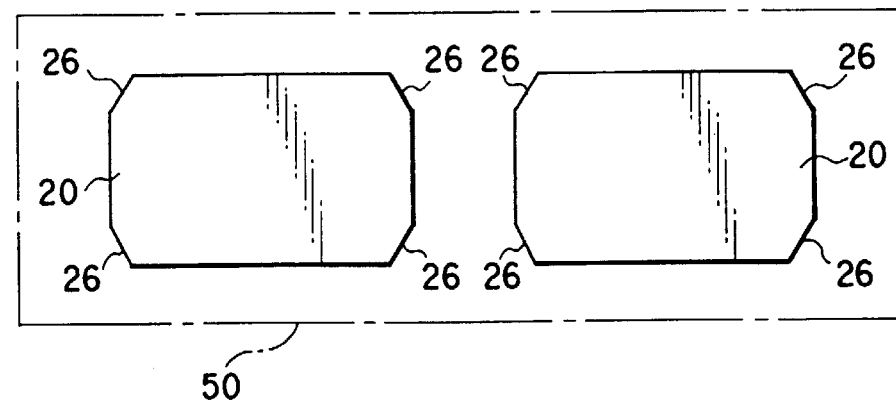
FIG. 5C shows chamfered portions provided to the eyepiece optical systems of the first embodiment.

In the above-mentioned example, as shown in FIG. 5A, the chamfered portion 26 is provided only to the corner facing the user's nose. As shown in FIG. 5B, the chamfered portion 26 may be provided to the lower two corners of the eyepiece optical system 20 so as to form the eyepiece optical system 20 symmetrically in order to decrease the manufacturing cost. As shown in FIG. 5C, the chamfered portion 26 may be provided to all the corners of the eyepiece optical system 20 such that the eyepiece optical system 20 is formed to balance the upper portion with the lower portion of the eyepiece optical system 20 and the user does not feel discomfort.

When the user observes the image, the backlight may shine through the periphery of the LCD and may enter the field of the user's vision to adversely affect the observing of the image. In order to solve this problem, it is preferable to provide between the LCD 25 and the eyepiece optical system 20 visual field limiting means (a visual field frame, for example) for limiting the visual field of the user. In this case, the corners of the visual field limiting means are preferable to be chamfered so as to correspond to the shapes of the eyepiece optical system 20 shown in FIGS. 5A to 5C, respectively. By providing the visual field limiting means in this manner, the image light beams can be prevented from being eclipsed.

Figure 6:
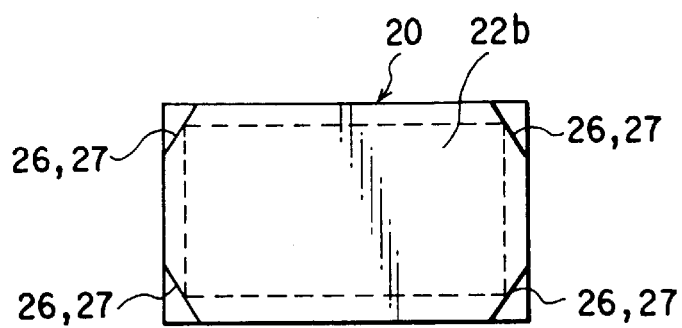
FIG. 6 shows a first prism, which is provided to the eyepiece optical system of the first embodiment, shown from a rear reflecting mirror of the first prism.

FIG. 6 shows a plan view of the eyepiece optical system 20 shown from the side of the second face 22b of the first prism 22.

As shown in FIG. 6, the chamfered portion 26 is formed on each of the corners of the eyepiece optical portion 20. In order to prevent the image light beams from being eclipsed by the chamfered portions 26, the rear reflection mirror needs to be provided in the region enclosed by the broken line. When the rear reflection mirror is limited in the region enclosed by the broken line, the rear reflection mirror cannot be formed maximumly.

In order to obtain the possibly large area of the rear reflection mirror, each of the corners of the second face 22b of the first prism 22 of this embodiment is provided with a chamfered portion 27 having the same shape (it is more preferable to round the corners) as that of the chamfered portion 26, and the entire face other than the chamfered portions 27 is coated with the rear reflection mirror.

By forming the eyepiece optical system 20 in this manner, the effective area of the rear reflection mirror can be increased and the field angle of the prism can be increased when the size of the first prism 22 is determined in advance, in comparing with the case where the rear reflection mirror is formed in the region enclosed by the broken line.

FIG. 7 shows the side view showing the eyepiece optical system 20 shown in FIG. 3A, from the arrow A. The second prism 23 of the eyepiece optical system 20 is provided with two planes 23b and 23c as the reference plains of the size management.

By providing two planes 23b and 23c to the second prism 23 of the eyepiece optical system 20, the first and second prisms 22 and 23 can be joined together simultaneously with the measurement of the thickness D1 and height D2 of the eyepiece optical system 20, as mentioned later. As the result, the joining precision can be improved.

The third face 23a facing the LCD 25 and having a light-transmission effect is formed so as to have a spherical central portion, and the face 23b is the tangential plain contacting the periphery of the third face 23a. The two planes 23b and 23c are provided to a portion through which the image light beam passing through the second prism 23 does not pass. Therefore, even if any damage of the plains such as a flaw is generated, the damage does not adversely affect the transmission of the image light beam. The use of the two planes 23b and 23c thus permits the size measurement with high precision.

FIG. 8 shows the eyepiece optical system 20 contained in a joining jig 28.

The joining jig 28 is formed such that the thickness D1 of the eyepiece optical system 20 is set at a desired value with an error of ±0.1 mm, for example, when the eyepiece optical system 20 is contained therein such that the inner periphery of the joining jig 28 contacts the first face 22a of the first prism 22 and the two planes 23b and 23c of the second prism 23.

The joining jig 28 is formed to have an open portion in a vertical direction with regard to the face of FIG. 8, and does not manage the size in a vertical direction with regard to the face of FIG. 8. Therefore, when the first and second prisms 22 and 23 are contained in the joining jig 28, it needs to be checked that ear portions 29-1 and 29-2 respectively provided to the ends of the first and second prisms 22 and 23 contact each other and do not form a step in a vertical direction with regard to the face of FIG. 8. By checking in this manner, the shift of the first and second prisms 22 and 23 in the vertical direction can be prevented.

FIG. 9A shows the eyepiece optical system 20 contained in the joining jig 30. FIG. 9B is the side view of the eyepiece optical system 20 shown in FIG. 9A without the joining jig 30.

The joining jig 30 is formed such that the thickness D2 of the eyepiece optical system 20 is set at a desired value with an error of ±0.1 mm, for example, when the eyepiece optical system 20 is contained therein such that the inner periphery thereof contacts a maximum point P1 of the second face 22b of the first prism 22 and the two planes 23b and 23c of the second prism 23.

The joining jig 30 is formed to have an open portion in a vertical direction with regard to the surface of FIG. 9, and does not manage the size in a vertical direction with regard to the face of FIG. 9.

The process of assembling (joining) of the first and second prisms 22 and 23 by use of the joining jigs 28 and 30 will be described below.

At first, the first and second prisms 22 and 23 are contained in the joining jig 28, for example, then it is checked whether or not the thickness D1 is set at the desired value.

Subsequently, the dimension between the plane 23c and the right end of the ear portion 29-2, between the right end of the ear portion 29-2 and the left end of the ear portion 29-1, and between the left end of the ear portion 29-1 and the first face 22a are measured respectively.

After checking whether or not the measured distances are set at desired values, the joining is performed.

The first and second prisms 22 and 23 are contained in the joining jig 30 thereafter, and then it is checked whether or not the thickness D2 is set at the desired value.

Subsequently, the dimension between the plane 23b and the upper end of the ear portion 29-2, between the upper end of the ear portion 29-2 and the lower end of the ear portion 29-1, and between the lower end of the ear portion 29-1 and the maximum point P1 of the second face 22b are measured respectively, and after checking whether or not the measured distances are set at desired values, the joining is performed.

It goes without saying that the joining process is done over again when the measured dimensions are not set at desired values in the above process.

In the assembling (joining) process as mentioned above, the planes 23b and 23c shown in FIG. 9A are used as reference planes of the size management, and the upper, lower, left, and right ends of the ear portions 29-1 and 29-2 shown in FIG. 9B are employed as reference planes of the size management. By using these planes to measure the thickness D1 and height D2 of the eyepiece optical system 20, D1 and D2 can be set at desired values (±0.1 mm, for example). Especially, the distance between the second face (rear reflection mirror) 22b producing the main refraction power of the eyepiece optical system 20 and the LCD 25 can be precisely measured, resulting that the assembling (joining) process can be performed easily and the assembling precision can be improved. Accordingly, the image with high quality can be attained by use of the head-mount image display apparatus according to the present embodiment using the eyepiece optical system 20 satisfying the desired precision as mentioned above.

FIGS. 10A and 10B respectively show the eyepiece optical system 20 provided with a joining plane 23d.

The joining plane 23d is provided to the face of the second prism 23 on the side of the user's eyeball to be parallel with the plane 23c as the reference plane for the size management.

When the first and second prisms 22 and 23 are joined each other by use of the joining plane 23d, a plane member 31 is provided to contact with the planes 23d and 22a, as shown in FIG. 10A. When the planes 23d and 22a are located on the same plain in this time, the planes 23d and 22a are parallel to each other and the prisms are joined as desired, and the joining step can be performed easily.

In the above-mentioned first embodiment, the frames such as the mirror frame containing the components such as the eye optical system 20 and LCD 25, and the visual field frame are used. It is more preferable to paint the frames in black or to perform reflection reducing coating on the frames for helping the observing the image.

It is also preferable to employ the spring member (not shown) for fixing the eyepiece optical system 20 only by clipping therewith.

The head-mount image display apparatus according to a second embodiment of the present invention will be described below in conjunction with FIGS. 11 and 12.

Figure 11:
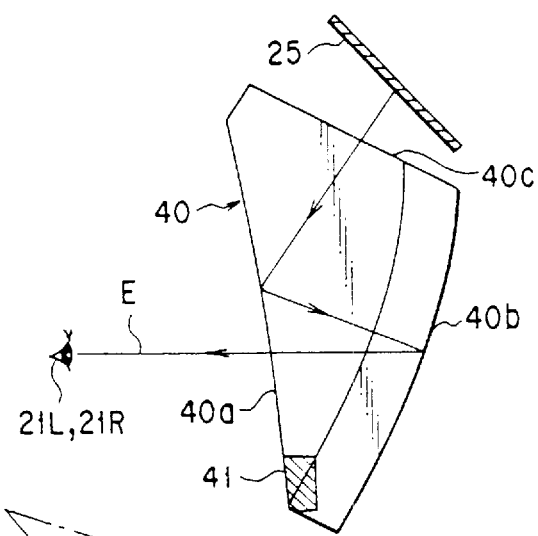
FIG. 11 shows the structure of the optical system in the body of a head-mount image display apparatus according to a second embodiment of the present invention.
Figure 12:
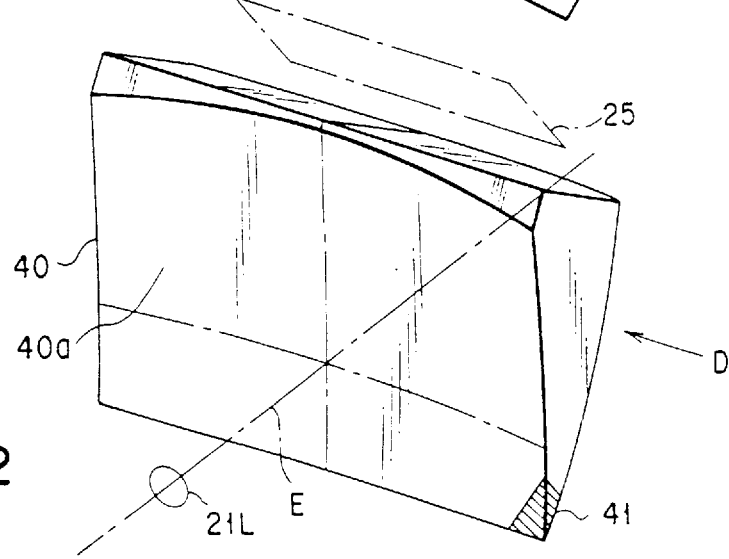
FIG. 12 is a perspective view of the eyepiece optical system according to the second embodiment.

FIGS. 11 and 12 show the structure of an eyepiece optical system 40 arranged in the body 10 (shown in FIG. 1) of the image display apparatus. FIG. 11 shows the eyepiece optical system 40 shown in FIG. 12 from an arrow D. The eyepiece optical system 40 is provided on the both sides of the left eyeball 21L and the right eyeball 21R of the user, to be arranged symmetrically and have the same structure. Accordingly, the description of the structure is provided only for the eyepiece optical system 40 on the side of the left eyeball 21L, and the description for the eyepiece optical system 40 on the side of the right eyeball 21R is omitted.

As shown in FIG. 11, the eyepiece optical system 40 is located in front of the left eyeball 21L of the user.

The eyepiece optical system 40 comprises a first face 40a facing the left eyeball 21L and having a light-transmission effect, a second face 40b having a reflection effect and comprising a rear reflection mirror, and a third face 40c facing the LCD 25 and having a light-transmission effect.

The second face 40b is arranged to gradually extend the distance from the user's eyeball in a direction from the visual axis the E toward the image display element 25. The LCD 25 is provided with a backlight not shown on the rear face.

In the eyepiece optical system 40 having the above structure, the light beams of the image displayed in the LCD 25 are transmitted the third face 40c at first, and enter into the first face 40a. The light beam total-reflected by the first face 40a is reflected by the second face 40b, then enters into the first face 40a again. The light beam transmitted through the first face 40a is guided to the user's eyeball. The head-mount image display apparatus according to this embodiment is provided with a pupil distance adjusting system 52 (shown in FIGS. 13A and 13B) supporting the LCD 25 and eyepiece optical system 40 on the side of the left eyeball 21L and the LCD 25 and eyepiece optical system 40 on the side of the right eyeball 21R such that the LCD 25 and the eyepiece optical system 40 for the left eyeball 21L is set at a predetermined distance from that of the right eyeball 21R.

The eyepiece optical system 40 employed in the present embodiment can carry more light amount than that of the eyepiece optical system 20 employed in the first embodiment in which the light beam from the LCD 25 passes through half mirror 24 twice till the light beam reaches the eyeballs 21L and 21R of the user and the light amount is decreased thereby, and can be formed with a smaller thickness.

As shown in FIG. 12, the eyepiece optical system 40 has a chamfered portion 41 on at least one (shaded in FIGS. 11 and 12) of lower right and left corners of the eyepiece optical system 40. The corner on which the chamfered portion 41 is formed faces the user's nose when the user wears the apparatus.

The chamfered portion 41 is preferable to be formed as small as possible so as not to decrease the area of the LCD 25. More specifically, the chamfered portion 41 is preferable to be formed below the visual axis E (shown in FIG. 12) of the user and in the region of one third of the entire area of the eyepiece optical system 40 from the bottom line.

By providing the chamfered portion 41 in this manner, the eyepiece optical system 40 does not touch the user's nose even if the apparatus is reduced in size by shortening the optical guide path of the image observing optical system as shown in FIGS. 11 and 12. Accordingly, even if the eyepiece optical system 40 may be arranged such that the components of the apparatus do not touch the nose of people whose pupil distance and positional relationship of eyes and nose fall within a predetermined range of normal distribution, the head-mount image display apparatus can be maximumly reduced in size and thus can be compact.

Figure 13A:
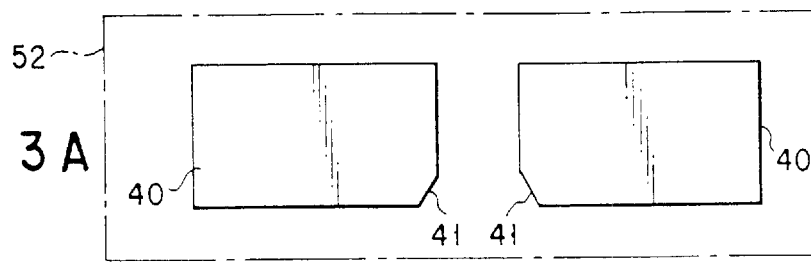
FIG. 13A shows chamfered portions provided to the eyepiece optical systems of the second embodiment.
Figure 13B:
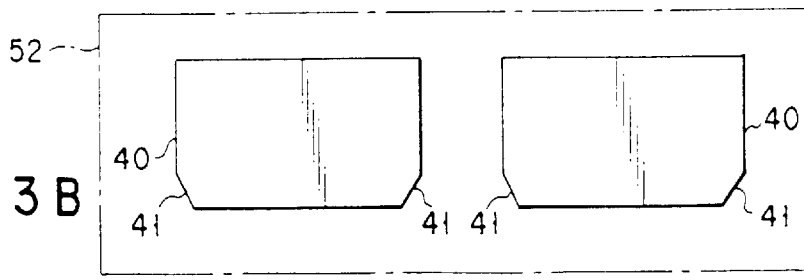
FIG. 13B shows chamfered portions provided to the eyepiece optical systems of the second embodiment.

In the above-mentioned example, as shown in FIG. 13A, the chamfered portion 41 is provided only to the corner facing the user's nose. As shown in FIG. 13B, the chamfered portion 41 may be provided to the lower two corners of the eyepiece optical system 20 to form the eyepiece optical system 40 symmetrically in order to decrease the manufacturing cost.

When the user observes the image, the backlight may shine through the periphery of the LCD and may enter the field of the user's vision to adversely affect the observing of the image. In order to solve this problem, it is preferable to provide between the LCD 25 and the eyepiece optical system 40 visual field limiting means (a visual field frame, for example) for limiting the visual field of the user. In this case, the corners of the visual field limiting means are preferable to be chamfered so as to correspond to the shapes of the eyepiece optical system 40 shown in FIGS. 13A and 13B, respectively. By providing the visual field limiting means in this manner, the image light beams can be prevented from being eclipsed.

In the above-mentioned second embodiment, the frames such as the mirror frame containing the components such as the eye optical system 40 and LCD 25, and the visual field frame are used. It is more preferable to paint the frames in black or to perform reflection reducing coating on the frames for helping the observing the image.

FIGS. 14A and 14B respectively show the other structure of the eyepiece optical system 40 of the head-mount image display apparatus according to the is second embodiment. The first face 40a of the eyepiece optical system 40 shown in FIGS. 11 and 2 is formed of one plane, while the first face 40a of the eyepiece optical system 40 shown in FIGS. 14A and 14B is provided with a draft portion 42 in which a wedge-shaped draft is formed.

By forming the draft portion 42 in this manner, the eyepiece optical system 40 can be easily cast off when the eyepiece optical system 40 is monolithically molded of plastic material, resulting in the improvement of the manufacturing efficiency. The eyepiece optical system 40 is monolithically molded of acrylic resin (PPMA, for example), so that the eyepiece optical system 40 is solid, and hard to be deformed. While, the eyepiece optical system 40 is monolithically molded of non-crystalline polyolefin, so that the eyepiece optical system 40 is formed so stable for humidity.

The eyepiece optical system 40 also has a protruded portion 43 formed on at least one of left and right nooks of the third face 40c. With this structure, the eyepiece optical system 40 can be easily protruded from cast formed in a predetermined shape by contacting a pin not shown to the rear face of the protruding portion 43, i.e., the rear face of the eyepiece optical system 40 which is parallel to the first face 40a, to urge the face. In this time, the urging force of the pin is applied to the portion in the third face 40c of the eyepiece optical system 40 through which the image light beam is not transmitted (i.e., the nooks of the third face 40c), and thus the third face 40c is not deformed and the image is not also deformed.

Figure 15A:
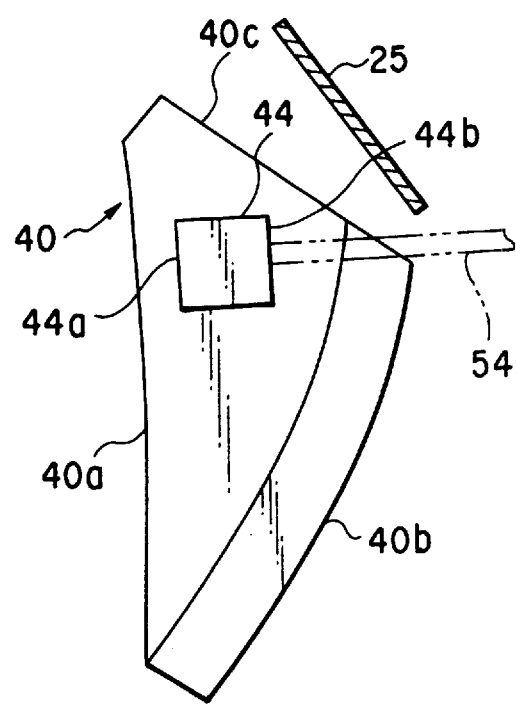
FIG. 15A shows still the other structure of the eyepiece optical systems of the head-mount image display apparatus according to the second embodiment.
Figure 15B:
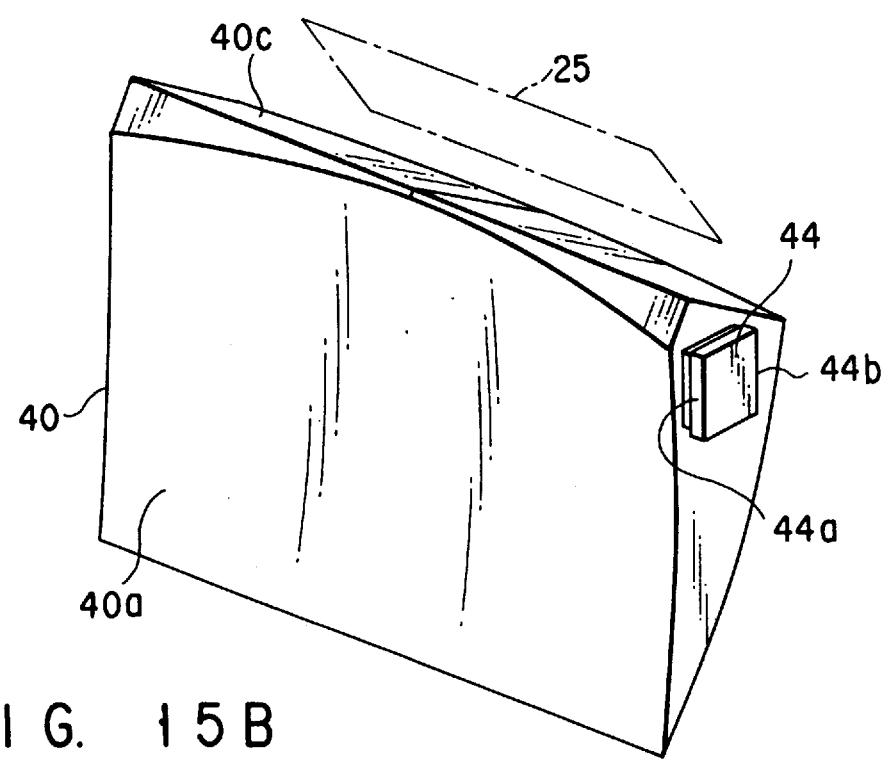
FIG. 15B is a perspective view of the eyepiece optical system shown in FIG. 15A.

FIGS. 15A and 15B respectively show the still other structure of the eyepiece optical system 40 of the head-mount image display apparatus according to the second embodiment.

As shown in FIGS. 15A and 15B, the eyepiece optical system 40 is provided with projected ear portions 44 on the left and right sides, respectively.

The ear portions 44 are substantially formed in a square. Among the four faces of one ear portion, faces 44a and 44b are arranged so as to be in parallel to the first face 40a.

The ear portions 44 are arranged on the left and right sides of the eyepiece optical system 40, through which the image light beam is not transmitted. The ear portions 44 are arranged on the faces through which the image light beam is transmitted, so that the faces on which the ear portions 44 are arranged is deformed thereby and the image is also deformed.

With this structure, the eyepiece optical system 40 can be easily cast by contacting a pin 54 to the face 44b to urge the face 44b. The left and right ear portions 44 can be used to support or position the eyepiece optical system 40.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An observation apparatus comprising:

an image forming member for forming an image which a user watches; and an eyepiece optical system for guiding the image formed by the image forming member to eyeballs of the user;

wherein the eyepiece optical system has at least one prism member, the prism member has at least three optical faces for optically functioning to transmit and/or reflect a light beam of the image in order to guide the image light beam, and at least two side faces arranged on a side of the optical faces;

said at least three optical faces comprising:

a first face arranged facing one of the eyeballs of the user, which outputs the image light beam from the prism member;

a third face arranged on a side of the image, though which the image light beam enters into the prism member;

a second face arranged in an optical path between the first and third faces, for reflecting the image light beam inside the prism member, wherein at least one of the corners of the first or second face of the prism member is chamfered to form a chamfered portion, and a side wall contacting the chamfered portion of the first or second face is chamfered in a similar manner as said at least one of the corners, so as to remove a part of corners of the prism member.

2. An observation apparatus according to claim 1, wherein the first face is chamfered at at least one portion in a peripheral portion arranged on an opposite side of the third face.

3. An observation apparatus according to claim 2, wherein the image forming member has left and right image forming members, and the eyepiece optical system has a left eyepiece optical system including a left prism member and right eyepiece optical system including a right prism member, the left prism member is chamfered at an end on a side of the right eyepiece optical system, the right prism member is chamfered at an end on a side of the left eyepiece optical system.

4. An observation apparatus according to claim 2, wherein the chamfered portions in the first face are formed below visual axes of the user.

5. An observation apparatus according to claim 2, wherein each of the chamfered portions is formed in a region of one third of an entire area of the first face from a bottom periphery of the first face.

6. An observation apparatus according to claim 1, wherein the first face is chamfered at both ends of a peripheral portion arranged on an opposite side of the third face.

7. An observation apparatus according to claim 1, wherein the first face is chamfered at both ends of a peripheral portion arranged on a side of the third face and at both ends of a peripheral portion arranged on an opposite side of the third face.

8. An observation apparatus according to claim 1, wherein the image forming member has left and right image forming members, and the eyepiece optical system has left and right eyepiece optical systems.

9. An observation apparatus according to claim 8, wherein the left and right image forming members and the left and right eyepiece optical systems are contained in a body section, further comprising a support member for supporting the apparatus at a head of the user such that the user stably holds the body section on a face of the user.

10. An observation apparatus according to claim 9, wherein in each of the left and right eyepiece optical systems, the image light beam emitted from corresponding one of the left and right image forming members passes through the third face to the first face, and enters into the first face again via the second face, and the image light beam passing through the first face is guided to a corresponding one of the left and right eyeballs of the user, respectively.

11. An observation apparatus according to claim 9, wherein each of the left and right eyepiece optical systems is formed such that the image light beam passing through the third face is totally reflected by the first face.

12. An observation apparatus according to claim 9, wherein each of the left and right eyepiece optical systems comprises two prisms and a semitransparent mirror arranged between the two prisms such that the image light beam turns back in an optical path between the second face and the semitransparent mirror.

13. An observation apparatus according to claim 8, wherein the left and right eyepiece optical systems are monolithically molded of a plastic material.

14. An observation apparatus according to claim 13, wherein each of the left and right eyepiece optical systems are provided with a protruded portion such that the left and right eyepiece optical systems can be protruded from casts formed in a predetermined shape during a step of monolithically molding the left and right eyepiece optical systems.

15. An observation apparatus according to claim 8, wherein each of the first faces is provided with a draft portion in which a draft is formed in a predetermined shape.

16. An observation apparatus according to claim 1, wherein the chamfered portions in the first face are formed below visual axes of the user.

17. An observation apparatus according to claim 1, wherein each of the chamfered portions is formed in a region of one third of an entire area of the first face from a bottom periphery of the first face.

18. An observation apparatus comprising:

a left image forming member for displaying an image for a left eyeball of a user;

a left eyepiece optical system for guiding the image for the left eyeball, which is displayed on the left image forming member, to the left eyeball;

a right image forming member for displaying an image for a right eyeball of the user;

a right eyepiece optical system for guiding the image for the right eyeball, which is displayed on the right image forming member, to the right eyeball; and positioning means for supporting the left and right image forming members and the left and right eyepiece optical systems such that the right image forming member and the right eyepiece optical system are arranged at a predetermined distance from the left image forming member and the left eyepiece optical system, wherein each of the left and right eyepiece optical systems has at least a first face facing corresponding one of the left and right eyeballs and having a light transmission effect, a second face comprising a rear reflection mirror and having a light reflection effect, and a third face facing the left and right image display elements and having a light transmission effect, the left and right eyepiece optical systems each comprises two optical members, and at least one of the optical members, through which an image light beam is not transmitted, is provided with two planes as reference planes for size management, and the two planes contact with a jig for joining the optical members.

* * * * *